(12) United States Patent
Komine et al.

(10) Patent No.: US 8,534,951 B2
(45) Date of Patent: Sep. 17, 2013

(54) JOINT UNIT

(75) Inventors: Tsuyoshi Komine, Sumoto (JP);
Manabu Komine, legal representative, Sumoto (JP); Masayuki Doi, Minamiawaji (JP)

(73) Assignee: Big Alpha Co., Inc., Sumoto-shi, Hyogo (JP)

( * ) Notice: Subject to any disclaimer, the term of this patent is extended or adjusted under 35 U.S.C. 154(b) by 95 days.

(21) Appl. No.: 13/061,224

(22) PCT Filed: Sep. 4, 2009

(86) PCT No.: PCT/JP2009/065518
§ 371 (c)(1),
(2), (4) Date: Apr. 14, 2011

(87) PCT Pub. No.: WO2010/027056
PCT Pub. Date: Mar. 11, 2010

(65) Prior Publication Data
US 2011/0188925 A1 Aug. 4, 2011

(30) Foreign Application Priority Data
Sep. 5, 2008 (JP) .................. 2008-228715

(51) Int. Cl.
*F16M 11/14* (2006.01)
(52) U.S. Cl.
USPC .......................... 403/56; 403/90; 248/288.51
(58) Field of Classification Search
USPC ............... 403/56, 90; 248/288.31, 288.51, 248/276.1, 904
See application file for complete search history.

(56) References Cited

U.S. PATENT DOCUMENTS

| 4,236,844 | A | * | 12/1980 | Mantele | .......................... 403/55 |
| 4,320,884 | A | * | 3/1982 | Leo | .............................. 248/276.1 |
| 4,402,481 | A | * | 9/1983 | Sasaki | ........................ 248/282.1 |
| 4,431,329 | A | * | 2/1984 | Baitelle | ........................... 403/55 |
| 4,491,435 | A | * | 1/1985 | Meier | .............................. 403/55 |

(Continued)

FOREIGN PATENT DOCUMENTS

| JP | 62-U-15619 | 1/1987 |
| JP | 63-280911 A | 11/1988 |

(Continued)

OTHER PUBLICATIONS

International Preliminary Report mailed on Apr. 14, 2011 in the corresponding International application No. PCT/JP2009/065518.

(Continued)

*Primary Examiner* — Joshua Kennedy
(74) *Attorney, Agent, or Firm* — Posz Law Group, PLC (57) ABSTRACT

A joint unit comprises a lock mechanism in which a ball-like joint section provided at the base end of an arm is housed in a holder formed at an end of a cylindrical case. As the joint section is brought into pressed contact against an inner surface of the holder, the lock mechanism locks a pivotal angle. In the lock mechanism, in response to a manual operation of a knob, a bolt is caused to project into the case and this pressing force is transmitted to a roller-like first pressing body and then to a second pressing body placed in contact therewith. Further, the pressing force from the first pressing body is transmitted to a pressure block and then the pressing force from this pressure block brings the joint section into pressed contact against the holder inner surface.

6 Claims, 5 Drawing Sheets

(56) References Cited

U.S. PATENT DOCUMENTS

| | | | |
|---|---|---|---|
| 5,092,551 A * | 3/1992 | Meier | 248/276.1 |
| 5,261,590 A * | 11/1993 | Tsai | 228/41 |
| 5,419,522 A * | 5/1995 | Luecke et al. | 248/288.51 |
| 5,681,018 A * | 10/1997 | Hoftman | 248/125.8 |
| 7,717,938 B2 * | 5/2010 | Kim et al. | 606/250 |
| 2009/0065671 A1 * | 3/2009 | Burgstaller | 248/288.31 |

FOREIGN PATENT DOCUMENTS

| | | |
|---|---|---|
| JP | 03-U-95776 | 9/1991 |
| JP | 2004-052911 A | 2/2004 |
| JP | 2006-123105 A | 5/2006 |

OTHER PUBLICATIONS

International Search Report mailed on Oct. 6, 2009 for the corresponding International patent application No. PCT/JP2009/065518.
Office Action issued on Aug. 30, 2012 in the corresponding Japanese Priority Application No. 2008-228715 (and English translation).

* cited by examiner

JOINT UNIT

CROSS REFERENCE TO RELATED APPLICATIONS

This application is a U.S. national stage application of PCT/JP2009/065518 filed on Sep. 4, 2009, and claims priority to, and incorporates by reference, Japanese Patent Application No. 2008-228715 filed on Sep. 5, 2008.

TECHNICAL FIELD

The present invention relates to a joint unit comprising a holder, an arm having a joint section to be housed in the holder and a lock mechanism configured to lock the arm at a desired pivotal angle by brining the joint section into pressed contact against the inner surface of the holder.

BACKGROUND ART

Patent Document 1 exists as an art relating to the joint unit having the above-described construction. Patent Document 2 exists as an art relating to the pressed contact.

With the construction disclosed in Patent Document 1, a spherical head section 21 formed at a base 16 of a ball joint is housed in a housing 17 against inadvertent withdrawal therefrom. A neck portion 22 formed integral with the spherical head section 21 is caused to project to the outside of the housing 17. Further, a pressure from a threaded bar 19 provided in a retaining portion 11 is transmitted via an attachment 18 provided inside the housing 17 to the spherical head section 21, whereby this spherical head section 21 is brought into pressed contact against the inner surface of the housing 17. As a result, the pivotal angle of the base 16 relative to the housing 17 can be locked as desired.

The construction disclosed in Patent Document 2 includes: three gripping portions 11A, 11B, 11C which come into contact with a cylindrical outer peripheral surface 101 of an object to be gripped ("gripped object" hereinafter) 100 to be deformed toward the center of the gripped object 100, thus gripping this object 100; a first member 21, plate-like second members 22A, 22B pivotally jointed to the opposed ends of the first member 21; cylindrical members 23A, 23B provided at the ends of the second members 22A, 22B; a ball 26 disposed between the cylindrical member 23A and the gripping portion 11A: and a male screw member 43 configured to cause a pressure generated by an operation of a hexagonal wrench 40 to be applied to the first member 21.

According to this Patent Document 2, the second member 22A and the second member 22B are housed under flexed conditions thereof within a flexed-member accommodating hole 33. In response to a rotational operation of the male screw member 43, the pressure from the male screw member 43 is applied to the first member 21. Then, the force from this first member 21 displaces the second member 22A and the cylindrical member 23, as a result of which the three gripping portions 11A, 11B, 11C are brought into pressed contact with the gripped object 100 for gripping this object 100.

PRIOR-ART DOCUMENTS

Patent Documents

Patent Document 1: Japanese Patent Application "Kokai" No. 2004-52911 (paragraphs [0010-0024], FIG. 3, FIG. 4)

Patent Document 2: Japanese Patent Application "Kokai" No. 2006-123105 (paragraphs [0017-0031], FIGS. 1-3)

SUMMARY OF THE INVENTION

Problems to be Solved by Invention

With the ball joint disclosed in Patent Document 1, the end portion of the cylindrical housing (corresponding to a "holder" provided in the present invention) is formed with a reduced diameter, thus forming a retaining portion for the spherical head portion (corresponding to a "joint section" provided in the present invention). And, for locking the pivotal angle of the base (corresponding to an "arm" provided in the present invention), the pressing force from the threaded bar (corresponding to a portion of a "lock mechanism" provided in the present invention) is caused to be applied via the attachment to the spherical head portion, such that this spherical head portion is brought into pressed contact against the inner surface of the retaining portion. As a result, due to the friction between the respective contacting surfaces thereof, the base and the housing are brought into a locked state, thereby to maintain an angle relative to each other.

Further, when a locking operation is to be effected with the ball joint disclosed in Patent Document 1, in order to realize a stable locked state with the spherical head portion (corresponding to the "joint section" provided in the present invention) being in pressed contact with the inner surface of the retaining portion in a uniform manner with as large contact area as possible, there is employed an arrangement such that the threaded bar is disposed on the axis (corresponding to the axis of the cylindrical portion) of the cylindrical housing (corresponding to the "holder" provided in the present invention) so as to apply the pressure along the direction of this axis.

However, with the disposing arrangement of the threaded bar disclosed in Patent Document 1, the dimension in the direction of the axis tends to be large. In this respect, there remains room for improvement.

To cope with the above, it is conceivable to arrange a locking threaded body under a posture perpendicular to the axis and to employ a slide member having e.g. a wedge-like shape for converting the force from this threaded boy into a force effective along the axis to be transmitted to the joint section. However, it was found that using such type of sliding member would impair smooth operation due to reduction in the sliding performance of the sliding member and/or generation of kink thereof.

To resolve such inconvenience as above, as described in Patent Document 2, it is conceivable to employ a lock arrangement configured to grip an object with a plurality of gripping portions. However, the construction disclosed in Patent Document 2 involves a large number of parts, thus inviting cost increase and great trouble in its assembly. In these respects, it was believed that employing this construction would not seem preferable or attractive.

The object of the present invention is to configure a joint unit in a reasonable manner, which does not invite disadvantageous enlargement or operational failure of the mechanism used for locking the pivotal angle of the arm relative to the holder.

Means for Achieving the Object

According to the characterizing feature of the present invention, there is provided a joint unit comprising a holder, an arm having a joint section to be housed in the holder and a lock mechanism configured to lock the arm at a desired pivotal angle by bringing the joint section into pressed contact against the inner surface of the holder, wherein said lock mechanism includes, within said holder, a first pressing body having a round cross section and configured for receiving a pressing force from a clamp, a second pressing body having a round cross section and placed in contact with the first pressing body for receiving the pressing force therefrom and a pressure block configured for causing the force from either the first pressing body or the second pressing body to be applied to the joint section for bringing this joint section into pressed contact with the holder inner surface.

With this construction, in case the clamp is operated in a pressing force applying direction, the pressing force from this clamp is applied to the first pressing body and then from this first pressing body to the second pressing body. Further, as the force from either one of these is transmitted to be applied to the pressure block, there is realized a locked state between the holder and the arm with the joint section being placed in pressed contact against the holder inner surface. With the above-described arrangement configured to apply a pressing force to the pressure block via the first pressing body and the second pressing body, the construction can omit such component such as a screw to be disposed under the posture along the direction for applying the pressure to the pressure block. Further, as the first pressing body and the second pressing body each has a round cross section, the pressing force can be transmitted via the respective outer faces thereof which are formed round, such that during the application of the pressing force, each body can pivot and can also readily pivot upon release of the pressing force applied thereto. Consequently, there has been realized a joint unit which does not invite any malfunction of the mechanism used for locking of the pivotal angle of the arm relative to the holder.

According to one possible construction of the present invention, the joint unit includes a cylindrical case that houses the pressure block while allowing movement thereof along the direction of the axis and that forms an inside space for accommodating the first pressing body and the second pressing body; and said clamp is configured such that a rotary operational portion is provided in a bolt for threading engagement with a female thread portion formed in said case, and said first pressing body and said second pressing body are maintained under a relative positional relationship with each other when a leading end of the bolt of the clamp is in agreement with an inner wall surface of said case.

With the above-described construction, when the bolt is rotated in response to an operation on the rotary operational portion of the clamp provided in the case, the force from this bolt is transmitted to the first pressing body and the second pressing body and then transmitted further to the pressure block. Further, in case also the leading end of the bolt is operated to the position in agreement with the inner wall surface of the case, the relative positional relationship between the first pressing body and the second pressing body is maintained, so that the pressing force from the bolt can be transmitted to the first pressing body in a reliable manner.

According to a further possible construction of the present invention, the relative positional relationship between the first pressing body and the second pressing body is maintained with setting of a cross sectional dimension of the first pressing body, a cross sectional dimension of the second pressing body and a dimension from one face of the pressure block on the side of the inner space to a further face thereof opposed thereto in the direction of the axis. With this construction, within the inner space of the holder, the first pressing body and the second pressing body contact each other; and with this contact between the first pressing body and the second pressing body, free movement thereof is restricted, so that the first pressing body and the second pressing body can be maintained under the relative positional relationship with each other.

According to still further possible construction of the present invention, the joint unit further includes a first retaining member for retaining said first pressing body and a second retaining member for retaining said second pressing body; and the pressing force from said clamp is applied to either one of said first and second retaining members in a direction for bringing said first pressing body and said second pressing body into the pressed contact with each other. With this construction, in response to the pressing force from the clamp, the first retaining member and the second retaining member are displaced relative to each other, such that the pressing force from either one of the first pressing body and the second pressing body can be applied to the pressure block for locking the holder and the arm relative to each other.

MODES FOR EMBODYING THE INVENTION

Next, embodiments of the present invention will be described with reference to the accompanying drawings.

Figure 1:
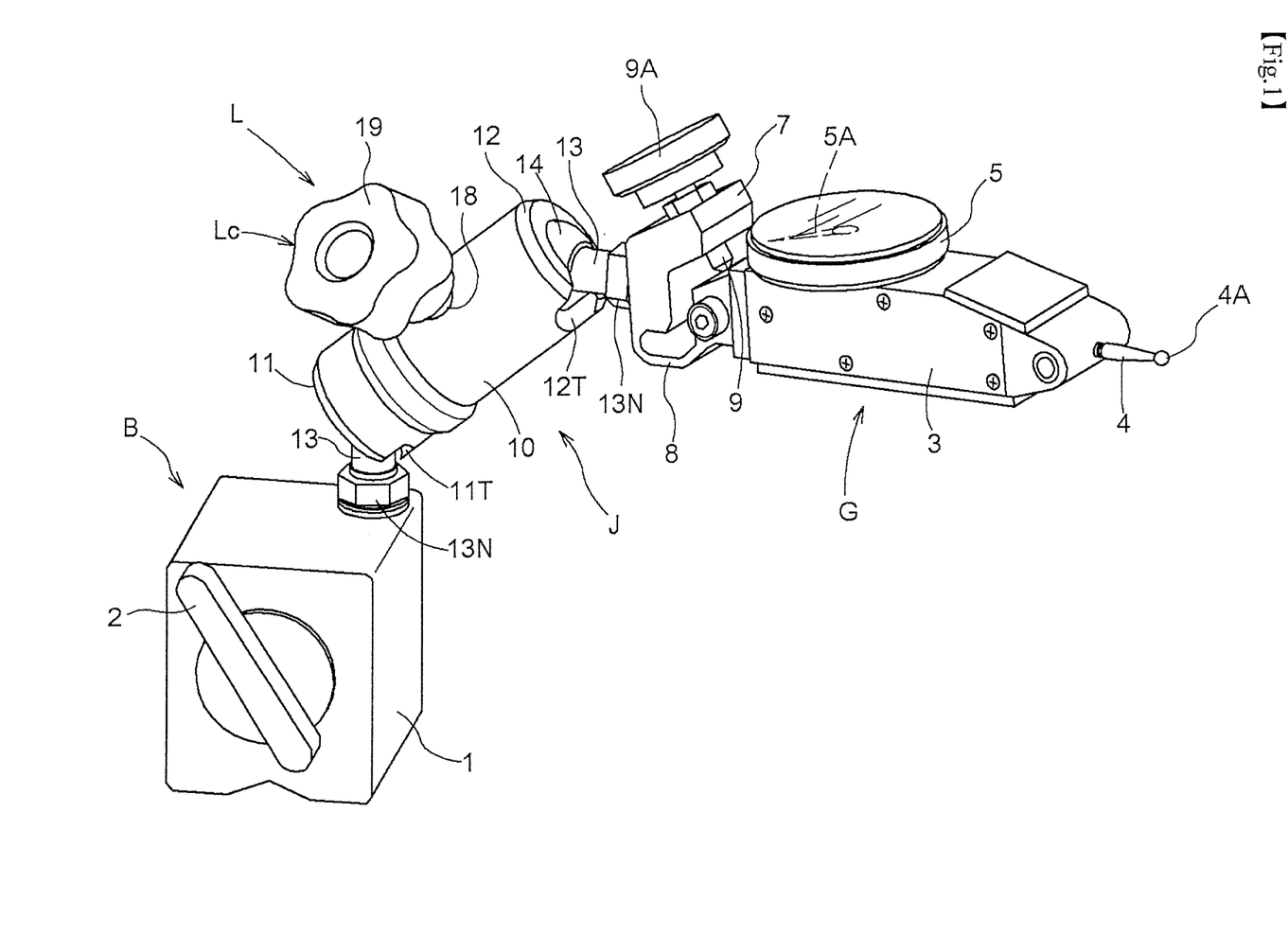
FIG. 1 is a perspective view of a measuring instrument.
Figure 2:
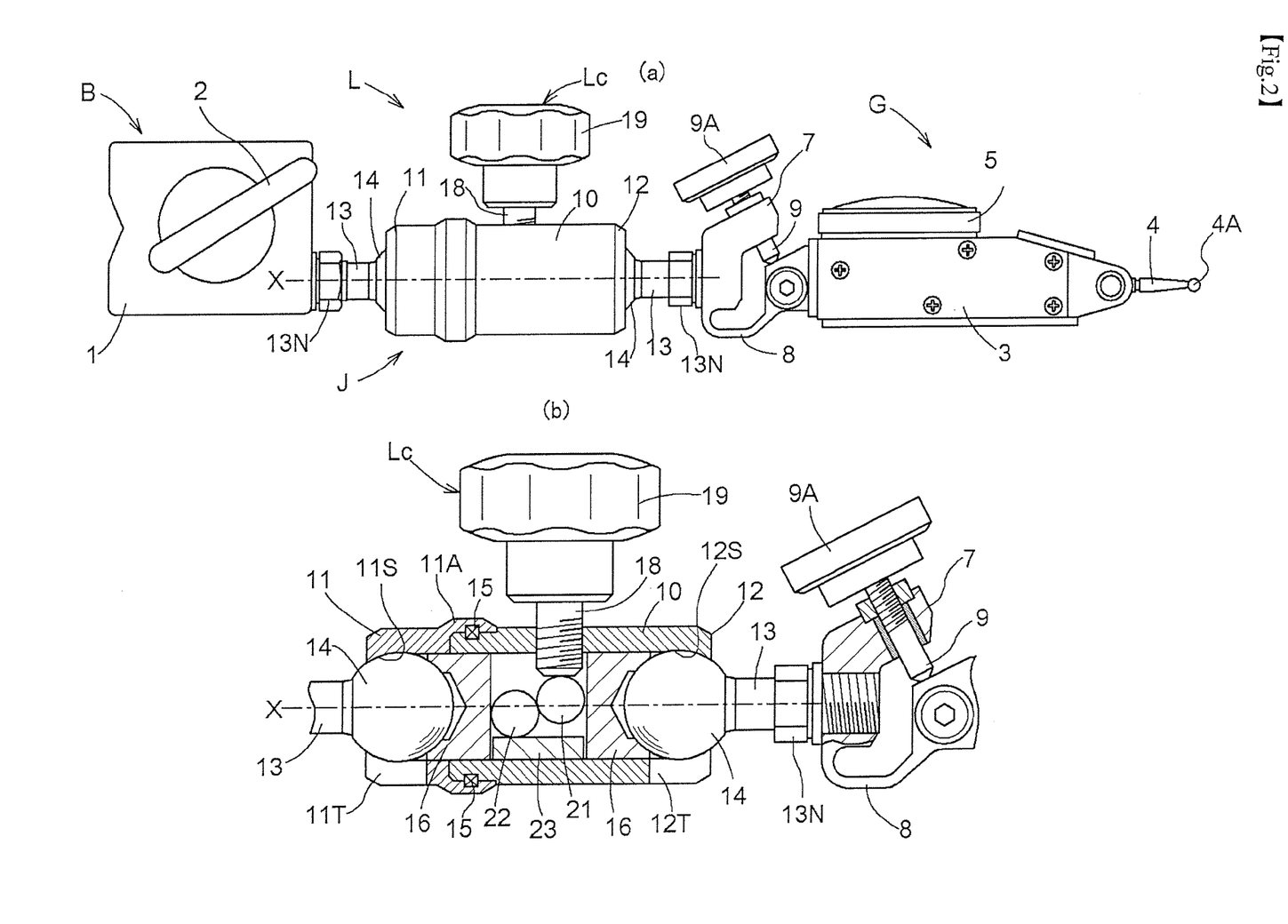
FIGS. 2(a) and 2(b) are sides views of the measuring instrument and a section view of a joint unit.

As shown in FIG. 1 and FIG. 2, a measuring instrument is constructed by connecting in series, a base unit B to be supported on a level block or a table, a joint unit J and a gauge unit G of a dial gauge type.

When using this measuring instrument, first the base unit B will be fixedly stuck to the level block or table formed of iron by means of magnetic force of a magnet. Then, under this condition, the base unit B and the gauge unit G will be set to a relative positional relationship with each other. Thereafter, this relative positions of and between the base unit B and the gauge unit G will be fixed by means of the joint unit J. Then, the terminal end of a contact shoe 4 of the gauge unit G will be placed into contact with the outer surface of an object to be measured ("measured object" hereinafter) such as a work or a tool supported to the level block or table via a jig or the like, so as to allow reading of a measured value from an indicator 5A of the gauge unit G.

The base unit B includes a handle 2 attached to an outer surface of a case 1. In response to a rotational operation of this handle 2, the position of the magnet (a permanent magnet, not shown) inside the case 1 is varied, whereby the base unit B can be switched over between a state where the unit B is fixedly and magnetically stuck to the iron table and a state where the unit B is released from the magnetic attraction.

The gauge unit G includes a gauge housing 3 supported to the joint unit J via a shock-absorbing mechanism, the shaft or bar-like contact shoe 4 provided to this gauge housing 3, and a dial displaying section 5 formed in the gauge housing 3. At the outer terminal end of the contact shoe 4, a spherical portion 4A is formed. The amount of displacement of the contact shoe 4 in the axial direction when the spherical portion 4A is brought into contact with the measured object is given as a mechanical or physical rotational amount to the indicator 5A of the dial displaying section 5.

The shock-absorbing mechanism integrally includes a plate spring portion 8 formed by bending a portion of a block-like frame 7 and an adjustment bolt 9 threaded to the frame 7 to be rotatably operated by a grip 9A. In operation, an initial elastic deformation amount can be set by bringing the leading end of the adjustment bolt 9 into contact with the free end of the plate spring portion 8 by a rotational operation on the grip 9A. At the time of measurement, an amount of play in the measuring direction will be provided by means of elastic deformation of the plate spring portion 8.

The joint unit J includes holders 11, 12 at the opposed ends of a case 10 comprising a cylindrical steel member and a lock mechanism L provided at the intermediate portion of this case 10. Incidentally, one holder 11 is formed as a separate member (made of steel) rotatably supported to the case 10 whereas the other holder 12 is formed integrally with the case 10.

The one holder 11 houses therein a ball-like joint section 14 provided at the base of an arm 13 to be connected to the base unit B, whereas the other holder 12 houses therein a ball-like joint section 14 provided at a base end of an arm 13 to be connected to the gauge unit G.

The arm 13 has a bolt-like construction forming a thread groove in its circumference. The one arm 13 will be threaded and fixed to the case 1 of the base unit B with a lock nut 13N and the other arm 13 will be threaded and fixed to the frame 7 of the gauge unit G with a lock nut 13N, thus forming the joined and fixed assembly.

The outer ends of the holders 11, 12 are reduced in their diameters, thus forming retaining portions for the joint sections 14. Further, on the inner sides of these outer ends, there are formed holder inner surfaces 11S, 12S provided in the form of concave surfaces having a radius equal to the radius of the joint sections 14. Further, at a portion of the periphery of the opening of the holder 11, 12 into which the arm 13 is to be inserted, there is formed along the radial direction a cutout groove 11T, 12T into which the arm 13 comes into engagement. As the arm 13 comes into engagement with this cutout groove 11T, 12T, there is obtained a large pivotal angle.

The case axis X is assumed to be present at the center position (in agreement with the center portion of the inner peripheral face) of the outer periphery of the case 10. And, the outer peripheral face of this case 10 has a reduced diameter at the portion thereof where the holder 11 is to be disposed. To this reduced-diameter portion, a sleeve 11A formed integrally with the holder 11 is engaged externally; and between this sleeve 11A and the case 10, there is disposed an engaging member 15 for providing retaining function therebetween. With this construction, the holder 11 is supported to be freely pivotable about the case axis X, with the holder 11 being maintained in its position along the direction of the case axis X relative to the case 10.

The lock mechanism L includes a roller-like first pressing body 21 provided inside the case for receiving a pressing force from a clamp Lc, a roller-like second pressing body 22 for receiving the pressing force from the first pressing body 21, a pressure block 16 provided on the side of the gauge unit for receiving the pressing force from the first pressing body 21, and a further pressure block 16 provided on the side of the base unit for receiving the pressing force from the second pressing body 22. Further, at a position inside the case 10 in opposition to the clamp Lc, there is provided a plate 23 for supporting the second pressing body 22, with the plate 23 being fixed to the inner surface of the case 10 by means of such technique as bonding or welding or pin-engagement with the case 10.

Figure 3:
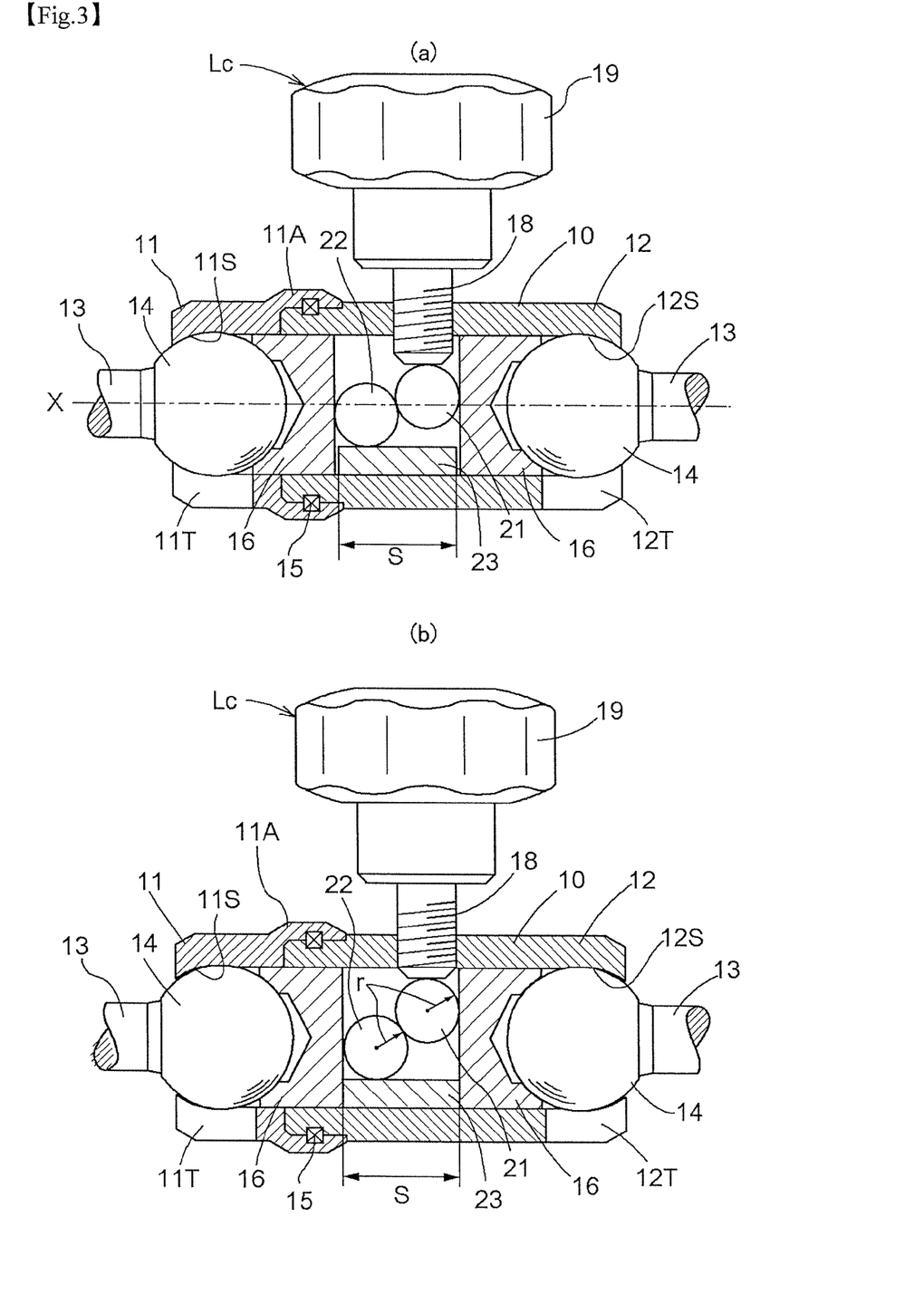
FIGS. 3(a) and 3(b) are section views of the joint unit showing the positional relationships between the first pressing body and the second pressing body under a locked state and an unlocked state, respectively.
Figure 4:
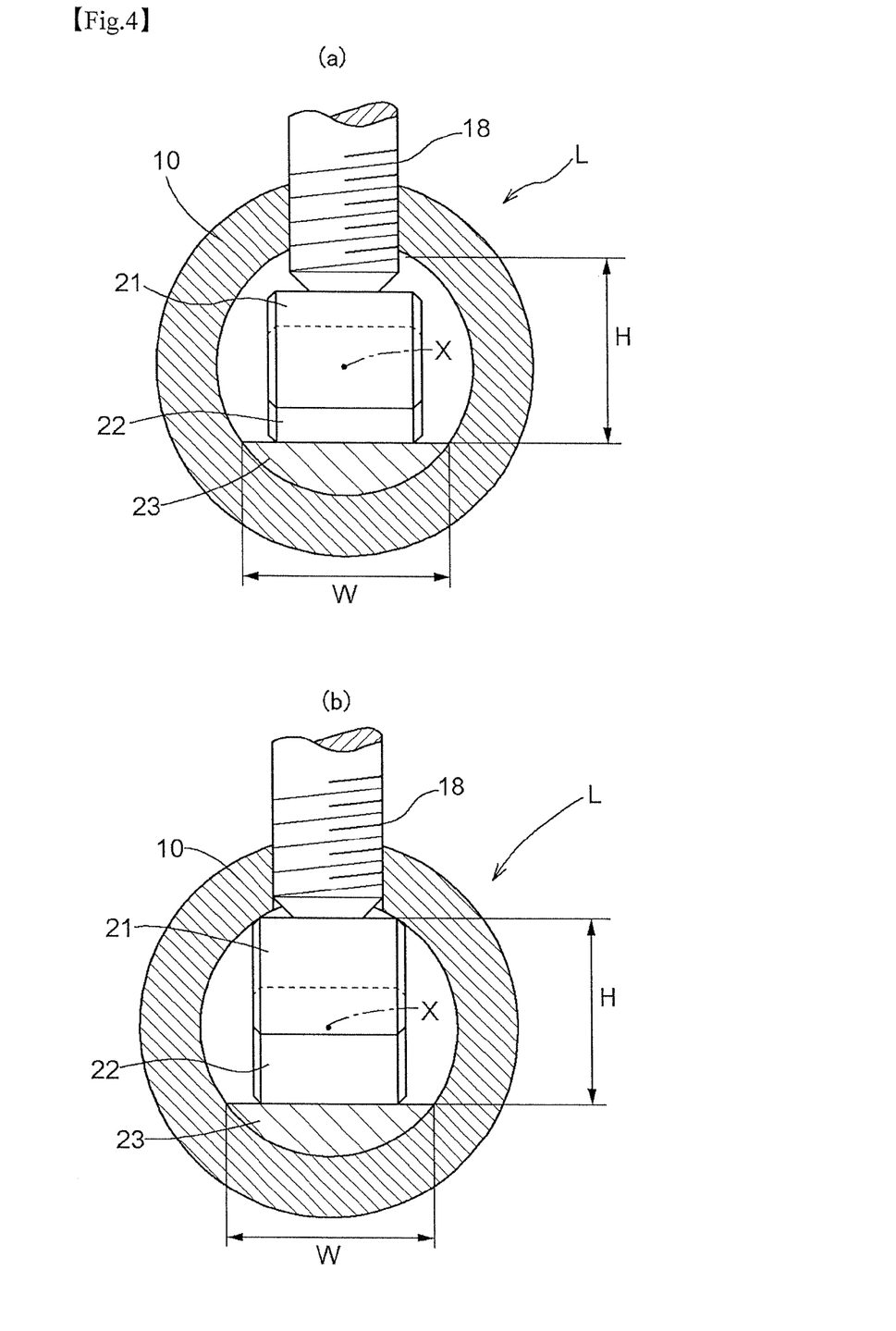
FIGS. 4(a) and 4(b) are section views showing the joint unit under the locked state and the unlocked state as seen along the direction of the case axis.

As shown in FIG. 3 and FIG. 4, the clamp Lc includes a bolt 18 threaded with the female thread portion formed in the case 10 under a posture perpendicular to the case axis X, and a knob 19 as a rotary operational portion which manually rotates the bolt 18. Incidentally, the first pressing body 21 and the second pressing body 22 are provided in the form of "rollers" using steel members having a round cross sectional shape. Both of the two pressure blocks 16 are provided in the form of "pistons" as a whole using metal or resin. And, these blocks 16 are engaged within the case 10 to be movable along the case axis X.

With this joint unit J, in order to maintain the relative positional relationship between the first pressing member 21 and the second pressing member 22 even when the bolt 18 of the clamp Lc is set at the position in agreement with the inner wall surface of the case 10, appropriate settings are made for a dimension S of the area in which the first pressing body 21 and the second pressing body 22 are movable along the case axis X inside the case 10, a dimension H of the area in which the first pressing body 21 and the second pressing body 22 are movable along the direction parallel with the axis of the bolt 18 (the direction normal to the case axis X and to the surface of the plate 23) inside the case 10, and a dimension W of the area in which the first pressing body 21 and the second pressing body 22 are movable in the lateral direction inside the case 10.

Incidentally, the above-described dimension S becomes the "distance" along the direction of the case axis X between those faces of the pair of pressure blocks 16 which are opposed to each other on the side of the inner space of the case, under the condition that the pressure applied to the first pressing body 21 from the bolt 18 of the clamp Lc is released. Further, since the first pressing body 21 and the second pressing body 22 are provided in the form of rollers and the plate 23 is provided as being fixed to the inner face of the case 10, the inconvenience of inadvertent rolling action of each body 21, 22 about the case axis X within the case is avoided.

More particularly, as "rollers" having a same radius (r) are used as the first pressing body 21 and the second pressing body 22, the dimensional relationship is set such that the above-described dimension S is smaller than the sum of the diameter (2r) of the first pressing body 21 and the diameter (2r) of the second pressing body 22 (S<4r). And, the dimensional relationship is set also such that the above-described dimension H is smaller than the sum of the diameter (2r) of the first pressing body 21 and the diameter (2r) of the second pressing body 22 (H<4r).

With this embodiment, because there is assumed the positional relationship that the two pressure blocks 16 contact the plate 23 under the condition where the bolt 18 of the clamp Lc is in agreement with the inner wall surface of the case 10, the dimension S agrees with the dimension of the plate 23 in the direction along the case axis X. Further, the dimension H corresponds to the distance between the surface position of the plate 23 and the position of the opposed ends of the first pressing body 1 contacting the inner surface of the case 10 opposed thereto, under the condition where the bolt 18 of the clamp Lc is in agreement with the inner wall surface of the case 10.

Further, the dimension W corresponds to the length of the longitudinally movable area of the second pressing body 22, under the condition where the bolt 18 of the clamp Lc is in agreement with the inner wall surface of the case 10.

Meanwhile, the condition of the relative positional relationship being maintained is established through combination of the following conditions. Namely, while the first pressing body 21 contacts the inner face of the case 10 to have its longitudinal movement thereof restricted, this first pressing body contacts the second pressing body 22 or the pressure block 16 on the gauge unit side. While the second pressing body 22 contacts the inner face of the case 10 to have its longitudinal movement thereof restricted, this second pressing body 22 contacts the first pressing body 21 or the plate 23 or the pressure block 16 on the base unit side.

With maintaining of the relative positional relationship described above, there is provided the predetermined positional relationship that the second pressing body 22 contacts or approaches the plate 23 and at the same time, this second pressing body 22 contacts or approaches the pressure block 16 on the base unit side; and also the first pressing body 21 contacts or approaches the leading end of the bolt 18 of the clamp Lc and at the same time, this first pressing body 21 contacts or approaches the pressure block 16 on the gauge unit side. And, this positional relationship is maintained even when a shock is applied from the outside or when a gravitational force is applied from some direction.

With the above-described construction, when the knob 19 of the clamp Lc is operated in the locking direction, in response to this rotary operational force from the knob 19, a pressing force is applied from the leading end of the bolt 18 to the first pressing body 21 and at the same time, this pressing force from the leading end of the bolt 18 is applied also to the second pressing body 22 placed in contact with the first pressing body 21.

In response to the above-described pressing force, the first pressing body 21 and the second pressing body 22 will revolve along the respective outer peripheral surfaces thereof, in the course of which each body 21, 22 will apply a force to the pressure block 16 in contact therewith in the direction of increasing the distance between the two pressure blocks 16 (the distance along the case axis X). As a result, the joint sections 14 to which the pressing forces from the pressure blocks 16 are being applied are pressed against the holder inner surfaces 11S, 12S, thus reaching a locked state for fixing the arms 13 at the respective desired pivotal angles. At the same time, rotational movement of the holder 11 about the case axis X is prevented, thus being locked to the case 10.

Conversely, when the knob 19 of the clamp Lc is operated in the unlocking direction, in response to the rotary operational force from the knob 19, the leading end of the bolt 18 is moved in the direction away from the first pressing body 21, thus releasing the pressures to the first pressing body 21 and the second pressing body 22 simultaneously, so that the two pressure blocks 16 are now allowed to move in the direction of decreasing the distance therebetween (the direction along the case axis X) relative to each other. As a result, the pressed contacts between the respective joint sections 14 and the holder inner surfaces 11S, 12S are released, thus rendering the arms 13 freely pivotable (that is, reaching the unlocked state). At the same time, free rotation of the holder 11 about the case axis X is allowed also.

In particular, with the above-described construction, the pressing force from the clamp Lc is transmitted from the first pressing body 21 having a round cross section to the second pressing body 22 also having a round cross section. Therefore, in comparison with a different construction wherein the pressing force from the clamp Lc is transmitted to a slidable intermediate member, the above construction does not invite operational failure and allows smooth operation as well as reliable and speedy locking and unlocking actions.

OTHER EMBODIMENTS

The present invention may be embodied as follows, alternatively to the foregoing embodiment (in the following discussion of other embodiments, components having the same functions as those in the foregoing embodiment are denoted with same reference numerals or marks as those used in the foregoing embodiment).

Figure 5:
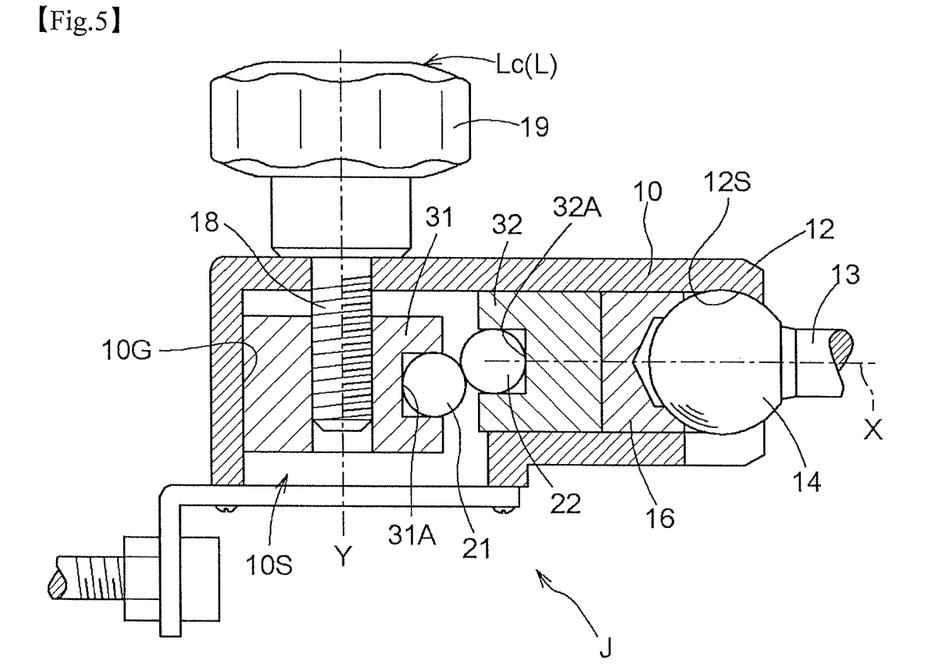
FIG. 5 is a section view of a joint unit according to a further embodiment (a)

(a) As shown in FIG. 5, a joint unit J includes a holder 12 at one terminal end of a cylindrical case 10 and at the other terminal end of the case 10, there is formed a flat guide face 10G disposed normal to the case axis X. And, on the side of this terminal end, an opening 10S is formed. Also on this other terminal end side of the case 10, there is disposed a first retaining member 31 with which a terminal end of the guide face 10G is placed in contact. The first retaining member 31 defines a recess 31A in which the roller-like first pressing body 21 is engaged and supported. Further, this first retaining member 31 defines a thread hole formed coaxial with an operational axis Y thereof extending parallel with the guide face 10G.

The holder 12 holds therein a ball-like joint section 14 formed at the base end of the arm 13. The holder 12 holds also the pressure block 16 for applying a pressing force to this joint section 14 and a second retaining member 32 with allowing movements thereof along the case axis X. The second retaining member 32 defines a recess 32A in which the roller-like second pressing body 22 is engaged and supported. The first pressing body 21 and the second pressing body 22 are disposed under a positional relationship shown in the same figure wherein the respective outer peripheries thereof contact each other.

The bolt 18 of the clamp Lc of the lock mechanism L extends through the case 10 and is threaded into the thread hole of the first retaining member 31. With the above-described construction in operation, when the knob 19 of the clamp Lc is rotated manually, the first retaining member 31 is displaced upward along the operational axis Y while sliding against the guide face 10G. In association with this displacement, the first pressing body 21 comes into pressed contact with the second pressing body 22 and the pressing force is transmitted from the second pressing body 22 to the second retaining member 32 and then to the pressure block 16, respectively along the case axis X. As a result, the joint section 14 becomes pressed against the holder inner surface 12S, thus reaching a locked state.

In the case of this further embodiment (a), the bolt 18 of the clamp Lc is placed in threaded engagement with the first retaining member 31. Instead, it is also possible to press the leading end of the bolt 18 against the first retaining member 31, for applying a pressing force thereto.

Figure 6:
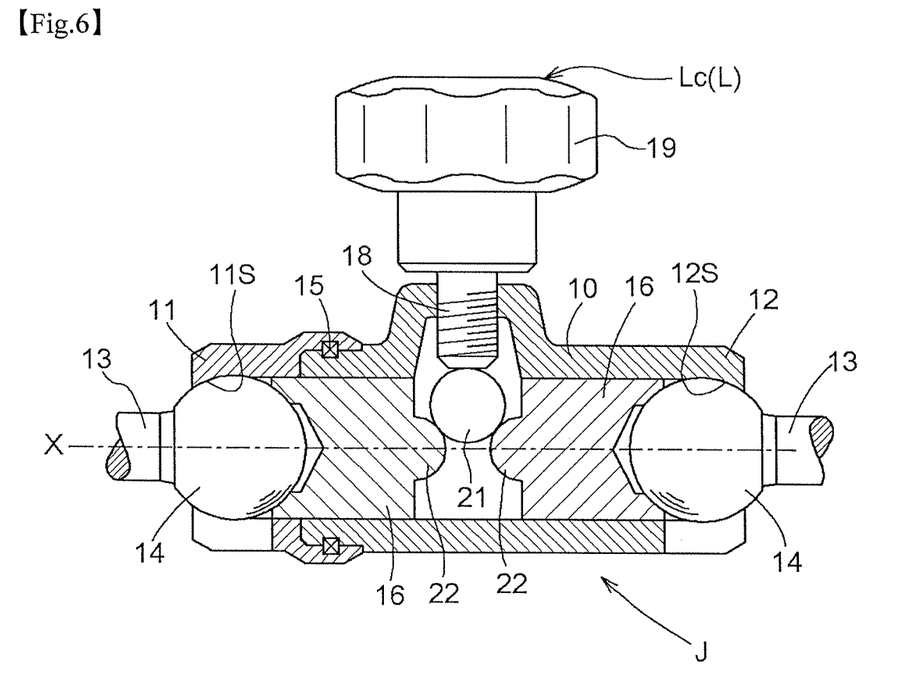
FIG. 6 is a section view of a joint unit according to a further embodiment (b).

(b) As shown in FIG. 6, a joint unit J includes a pair of holders 11, 12 at opposed ends of the cylindrical case 10 and each holder 11, 12 holds therein a ball-like joint section 14 connected to the arm 13. Further, the case 10 houses therein a pair of pressure blocks 16 for applying pressing force to the joint sections 14, with the blocks 16 being movable along the case axis X.

This case 10 defines, at an intermediate portion thereof, a female thread portion in which the bolt 18 of the clamp Lc is threaded under a posture normal to the case axis X. The case 10 houses therein a roller-like first pressing body 21 for receiving a pressing force from the bolt 18. The mutually opposed faces of the pair of pressure blocks 16 form second pressing bodies 22 for coming into contact with the first pressing body 21. Each second pressing body 22 is provided in the form of a roller having a portion thereof removed and has an incomplete round or circular cross section.

As shown in the same figure, the first pressing body 21 and the second pressing bodies 22 are placed under the positional relationship with these members contacting each other. With this, when the knob 19 of the clamp Lc is manually operated, a pressing force is applied from the leading end of the bolt 18 to the first pressing body 21 and at the same time, a pressing force is applied from this first pressing body 21 to the pair of second pressing bodies 22 placed in contact therewith. And, each of the pair of second pressing bodies 22 applies a pressing force to each pressure block 16 corresponding thereto. As a result, the joint sections 14 are pressed against the holder inner surfaces 11S, 12S respectively, thus reaching a locked state.

(c) In the above, the first pressing body 21 and the second pressing body 22 have a same length. Instead of this, it is possible to employ pressing bodies of different lengths, such as the second pressing body 22 having a longer length that the first pressing body 21. Or, it is also possible to employ "balls" made of steel or the like as the first pressing body 21 and the second pressing body 22.

(d) In place of the cylindrical case 10, it is possible to employ a case 10 in the form of an angular "pipe" having a rectangular cross section. In this case of using such angular pipe, the dimension H and the dimension W agree with the distance of the inner face of the case 10. Further, in this case of using such angular pipe, even if "balls" are employed as the first pressing body 21 and the second pressing body 22, this will not invite the inconvenience of these "balls" rotating along the inner surface of the case 10 about the case axis X.

(e) As the joint section, in place of the ball-type portion capable of three-dimensional rolling action, a member that effects rotation or rolling in two-dimensional manner can be used. Specifically, a bar-like pivot portion may be formed at the base end of the arm. And, this pivot portion is supported to the holder and the pressure block is placed in contact with the outer peripheral portion of the pivot portion, thereby providing a locking action.

(f) The joint unit can include an arm only at on terminal end of the case.

(g) This joint unit can be used not only for a measuring instrument, but for locking the posture of a level block of a tripod used for photographing by a camera or at a joint section for supporting a lamp for illumination.

INDUSTRIAL APPLICABILITY

The present invention can be used as joint units in general using a lock mechanism which is locked by a pressing force from a clamp.

The invention claimed is:

1. A joint unit comprising:
a cylindrical case;
first and second holders arranged at ends of the cylindrical case;
first and second arms each having a joint section respectively housed in the first and second holders, and
a lock mechanism pressing the joint sections against an inner surface of the first and second holders, the lock mechanism being arranged within the cylindrical case and including:
first and second pressing bodies each having a round cross section, the second pressing body contacting and pressing against the first pressing body,
first and second pressure blocks, one of the first and second pressure blocks arranged between the first pressing body and the joint section of one of the first and second arms, and another of the first and second pressure blocks arranged between the second pressing body and the joint section of another of the first and second arms, the first and second pressure blocks being movable in an axial direction of the cylindrical case; and
a clamp having a bolt extending through a hole formed in the cylindrical case and pressing against the first pressing body, while the first pressing body directly presses against one of the first and second pressure blocks and the second pressing body, and while the second pressing body directly presses against at least another of the first and second pressure blocks,
wherein an area inside the cylindrical case housing the first and second pressing bodies has a dimension (S) along the axial direction of the cylindrical case that is smaller than a sum of diameters of the first and second pressing bodies, and a dimension (H) in a direction the bolt presses against the first pressing body that is smaller than the sum of diameters of the first and second pressing bodies.

2. The joint unit according to claim 1, further comprising a first retaining member retaining the first pressing body and a second retaining member retaining the second pressing body,
wherein the first retaining member and the second retaining member are provided respectively between the first and second pressing bodies and the first and second pressure blocks.

3. The joint unit according to claim 1, wherein the clamp simultaneously locks in place or releases the first and second joint sections together with the first and second arms respectively connected thereto.

4. The joint unit according to claim 1, wherein the bolt is threaded into the hole formed in the cylindrical case, and tightening or loosening of the bolt simultaneously locks in place or releases the first and second joint sections in place together with the first and second arms respectively connected thereto.

5. A joint unit comsrising:
first and second arms each terminating in a joint section;
a cylindrical case having holders with a smaller width than the case and holding the joint sections of the first and second arms within the case,
a lock mechanism arranged in the case and between the joint sections of the first and second arms, the lock mechanism simultaneously pressing the joint sections of the first and second arms against an inner surface of the first and second holders with an adjustable pressing force, and the lock mechanism including:
first and second pressure blocks respectively contacting the joint section of one of the first and second arms
first and second pressing bodies arranged between and contacting the first and second pressure blocks, the first and second bodies contracting each other and, the first and second pressing bodies each having a round cross section, and
a claim having a bolt threaded through a hole formed in the case, the bolt pressing against and contacting at least one of the first and second pressing bodies,
wherein tightening or loosening of the bolt is directly related to the adjustable pressing force simultaneously pressing the inner surfaces of the first and second holder of the first and second arms by the tightening action of the bolt adjustably pressing against at least one of the first and second pressing bodies, the first and second pressing bodies adjustably and directly pressing the first and second pressure blocks, and the first and second pressure blocks simultaneously and adjustably and directly pressing the inner surfaces of the first and second portions for holding in place or releasing the first and second arms, and wherein an area inside the cylindrical case, which houses the first and second pressing bodies, has a dimension (S) along the axial direction of the cylindrical case that is smaller than a sum of widths of the first and second pressing bodies, and a dimension (H) in a direction the bolt presses against the first pressing body that is smaller than the sum of diameters of the first and second pressing bodies.

6. The joint unit according to claim 5, further comprising a first retaining member retaining the first pressing body and a second retaining member retaining the second pressing body, wherein the first retaining member and the second retaining member are provided respectively between the first and second pressing bodies and the first and second pressure blocks.

\* \* \* \* \*